(12) United States Patent
Von Holst et al.

(10) Patent No.: US 11,860,182 B2
(45) Date of Patent: Jan. 2, 2024

(54) SENSOR ARRANGEMENT FOR DETECTING THE DENSITY OF HARVESTED CROPS IN A SILO AND COMPACTION VEHICLE PROVIDED THEREWITH

(71) Applicant: DEERE & COMPANY, Moline, IL (US)

(72) Inventors: Christian Von Holst, Hettenleidelheim (DE); Stefan Brocke, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 325 days.

(21) Appl. No.: 17/446,994

(22) Filed: Sep. 7, 2021

(65) Prior Publication Data

US 2022/0146391 A1 May 12, 2022

(30) Foreign Application Priority Data

Nov. 6, 2020 (DE) .......................... 102020129359.3

(51) Int. Cl.
*G01N 9/32* (2006.01)
*G01N 9/26* (2006.01)
*G01N 9/36* (2006.01)
*A01F 25/16* (2006.01)

(52) U.S. Cl.
CPC ................. *G01N 9/32* (2013.01); *G01N 9/26* (2013.01); *G01N 9/36* (2013.01); *A01F 25/166* (2013.01)

(58) Field of Classification Search
CPC .............. G01N 9/26; G01N 9/32; G01N 9/36
See application file for complete search history.

(56) References Cited

U.S. PATENT DOCUMENTS

| | | | |
|---|---|---|---|
| 2018/0149570 A1* | 5/2018 | Oelberg | .................... G01N 9/36 |
| 2020/0281248 A1 | 9/2020 | Smith et al. | |
| 2021/0321571 A1 | 10/2021 | Brocke et al. | |

FOREIGN PATENT DOCUMENTS

| | | | | |
|---|---|---|---|---|
| DE | 102020110297 A1 | 10/2021 | | |
| EP | 0485772 A2 * | 10/1991 | | |
| EP | 1795884 A1 | 6/2007 | | |
| EP | 1795885 A1 * | 6/2007 | ........... | A01F 25/166 |
| EP | 3195719 A1 | 7/2017 | | |
| EP | 3403487 A1 | 11/2018 | | |
| EP | 3403488 A1 | 11/2018 | | |
| FR | 2767386 A1 * | 2/1999 | ........... | A01D 41/127 |
| JP | 2020139825 A * | 9/2020 | | |

OTHER PUBLICATIONS

Machine translation of FR-2767386-A1 (Year: 1999).*
(Continued)

*Primary Examiner* — Nathaniel J Kolb

(57) ABSTRACT

A sensor arrangement for detecting a density of harvested crops deposited as silage in a silo includes a source of a pressurized gaseous medium and an opening connected by a line to the source and which is movable along a surface of the silage. The gaseous medium is guided out of the opening from the source into the silage. The arrangement further includes a sensor for detecting a property of the medium flowing through the line, and an evaluation device connected to the sensor for providing an output signal containing information based on the signal of the sensor regarding the density of the silage.

20 Claims, 2 Drawing Sheets

(56) References Cited

OTHER PUBLICATIONS

Machine translation of EP-0485772-A2 (Year: 1991).*
Machine translation of JP-2020139825-A (Year: 2020).*
Machine translation of EP-1795885-A1 (Year: 2007).*
Christian Fuel et al., Gasket Measurement Principles in Additive Products, 63 Agricultural Technology, Feb. 2008, pp. 94-95.
D. Rees et al., Apparatus for Obtaining an Undisturbed Core of Silage and for Measuring the Porosity and Gas Diffusion in the Sample, Nov. 22, 1982, pp. 107-114.
Wikipedia, Silage, <URL: https://en.wikipedia.org/wiki/Silage?_sm_au_=iVVrHHII7pQ4FId3L321 jK0f1JH33>, retrieved on Aug. 31, 2021, 8 pages.
Rainer Tahl et al., Good silo compaction—key to high conservative quality, Bornimer Agricultural Technical Reports, pp. 25-34, Potsdam-Bornim, 2009.
European Search Report in European Patent Application No. 21202923.5, dated Mar. 9, 2022, 5 pages.

\* cited by examiner

SENSOR ARRANGEMENT FOR DETECTING THE DENSITY OF HARVESTED CROPS IN A SILO AND COMPACTION VEHICLE PROVIDED THEREWITH

RELATED APPLICATIONS

This application claims priority to German Patent Application No. 102020129359.3, filed Nov. 6, 2020, the disclosure of which is hereby incorporated by reference herein.

FIELD OF THE DISCLOSURE

The present disclosure relates to a sensor arrangement for detecting the density of harvested crops deposited as silage in a silo and a compaction vehicle provided therewith.

BACKGROUND

Silage is a type of fodder which is produced from green foliage plants which are stored in a silo and stabilized by acidification. The acidification takes place by fermentation. The finished silage may be fed to cows, sheep and other ruminants. The storage and fermentation process is denoted as silaging and is carried out by using whole grass plants (not only the seed heads), such as maize, sorghum or other cereals.

In some countries (for example, North America, Australia, northwestern Europe and New Zealand) it is usual to deposit the silage in large heaps on the ground and to drive over the silage with a tractor in order to force out the air, and then to cover it with plastic sheeting which is fixed by used tires or tire ring walls. In other countries (for example, northern Europe) so-called bunker silos, which comprise a floor and side walls made of concrete or other materials (for example, railway sleepers), are used for unloading the silage. In this case, the compaction and sealing are also carried out by sheeting which is fixed by tires.

In the past the fermentation was generally carried out by indigenous micro-organisms, while nowadays, however, the silage is generally supplied with ensilage agents in which specific micro-organisms are contained in order to accelerate the fermentation or to improve the silage. Ensilage agents may contain one or more strains of lactic acid bacteria, generally *Lactobacillus plantarum*. Other bacteria used include the species *Lactobacillus buchneri, Enterococcus faecium* and *Pediococcus*.

The silage stored and covered in the silo is accordingly subjected to an anaerobic fermentation, which starts approximately 48 hours after filling the silo and converts sugars contained in the plants into acid. The fermentation is substantially terminated after approximately 2 weeks. Before the anaerobic fermentation starts, there is an aerobic phase in which the oxygen contained in the silage is consumed. The packing density of the fodder determines the quality of the silage obtained.

If the fodder is well compacted, the supply of oxygen is limited and the resulting acid-based fermentation causes a decomposition of the carbohydrates present into acetic acid, butyric acid and lactic acid. Such a silage product is denoted as sour silage. If, however, on the other hand the fodder is not well compacted or loosely deposited or the silo is only filled up gradually, the oxidation takes place more rapidly and the temperature rises. In these cases the penetrating oxygen of the air may lead to the production of ammonia or butyric acid and in the worst case the silage may become toxic and may no longer be used as animal fodder. If the fermentation process is not carefully carried out and controlled, therefore, the sour silage takes on an unpleasant odor due to the excessive production of ammonia or butyric acid (the latter is responsible for the odor of rancid butter).

For the production of high quality silage it is accordingly important to compact the fodder sufficiently well in order to avoid the negative effect of oxygen pockets. Additionally, when opening the silage heap the inflow of oxygen is determined by the packing density. The denser the silo, the more slowly oxygen flows therein after opening. The less oxygen available, the more slowly the bacteria and mildew contained in the silo break down the protein contained therein. Accordingly, the reduction of the energy lost between opening the heap and using the silage as animal fodder is directly dependent on the packing density.

Various methods have been disclosed for the online detection of the compaction achieved, even during the ongoing compaction process, in order to automate the compaction or at least to provide instructions to the driver of the compaction vehicle at which points a further compaction has to be carried out and where this is not necessary. To this end, measurements of the height of the silage heap before and after compaction (EP 3 403 487 A1, EP 3 403 488 A1), radiometric density measurements (EP 1 795 884 A1), radar waves (EP 3 195 719 A1) and various other measuring methods are mentioned (C. Fürll et al., Prinziplösungen für die Dichtemessung in Siliergütern [Basic solutions for measuring the density in silage materials], Agricultural Engineering Volume 63, 2/2008, pages 94 to 95).

A measuring method mentioned in the publication by Fürli et al. for measuring the density in silage is flow measurement which, however, according to Fürll et al. is not suitable for measurement when the vehicle is moving. To examine the pore volume in a silage sample using a method known from soil physics based on the general gas law, reference should also be made to R. Tolle et al., Gute Verdichtung im Silo-der Schlüssel zu hoher Konservatqualität [Effective compaction in silos—the key to higher preservation quality], Bornim Agricultural Engineering Reports, No. 68, pages 25 to 34, Potsdam-Bornim 2009, and D. Rees et al., Apparatus for obtaining an undisturbed core of silage and for measuring the porosity and gas diffusion in the sample, Journal of Agricultural Engineering Research 28 (1983), 107-114. In this case, a sample of prepared silage is taken, filled into a gas-tight container and supplied with air at a specific pressure. Subsequently the pressure source is disconnected and a second chamber is connected to the container, and finally the resulting pressure in the line between the container and the chamber, which represents a measurement of the porosity of the silage, is detected. These measuring methods are accordingly only suitable for verifying the density of the silage after the silaging has been completed, but not during the compaction process ("online").

Conventional sensors are relatively complex and costly (radar sensor, height measurement by GPS), problematic from the point of view of occupational safety (radiometric measurement), suffer from the inability to penetrate the depth (laser measurement, ultrasonic distance sensor) or are not suitable for online measurement (flow measurement of silage samples). Thus, there is a need to avoid or at least to reduce the aforementioned drawback.

SUMMARY

According to the present disclosure, a sensor arrangement for detecting the density of harvested crops deposited as silage in a silo comprises a source of a pressurized gaseous medium, an opening which is connected by a line to the source and which is movable along the surface of the silage, the gaseous medium being able to be guided out of the opening from the source into the silage, a sensor for detecting a property of the medium flowing through the line and an evaluation device which is connected to the sensor and which is configured to provide an output signal which contains information based on the signal of the sensor regarding the density of the silage.

The present disclosure is based on the idea that a gaseous medium flows through a densely packed silo (i.e., harvested crops deposited as silage) more slowly or at lower flow rates than a less dense silo. Correspondingly, the flow resistance for the medium varies according to the density of the silage. Accordingly, it is proposed to allow the gaseous medium, such as air, to flow through the harvested crops through an opening which may be guided along the surface thereof, and to measure directly or indirectly the flow resistance by a sensor and thus finally to draw conclusions about the silage density and to provide a corresponding output signal through an evaluation device. The flow resistance may be determined, for example, using a relationship of the pressure and volumetric flow rate as is described below. The sensor arrangement according to the present disclosure is characterized in that it is of relatively simple construction and yet delivers relatively accurate results.

The sensor may thus be configured to detect a variable influenced by the flow resistance which the silage applies against the medium flowing out through the opening and to derive the output signal therefrom.

The sensor may be configured to detect the volumetric flow rate of the medium through the line and thus through the opening.

In one embodiment, the evaluation device is connected to a valve which is arranged in the line between the source and the opening and which influences the pressure of the medium at the opening, and the evaluation device is configured to activate the valve such that the volumetric flow rate detected by the sensor corresponds to a target value and to determine the output signal on the basis of the pressure of the medium at the opening or downstream of the valve at which the target value of the volumetric flow rate is produced. It might also be conceivable to use a measurement of the prevailing back pressure (upstream of the valve) as an output signal.

In a further embodiment, the pressure of the medium at the opening is adjustable to a predetermined pressure by a valve arranged in the line between the source and the opening and the evaluation device is configured to determine the output signal on the basis of the volumetric flow rate detected by the sensor.

There is also the possibility that the sensor is configured to detect the flow rate of the medium through the opening. To this end, the sensor may comprise two pressure sensors which are arranged at different points along a line which widens, in particular in a continuous or stepwise manner in the flow direction of the medium, between the source and the opening, and the evaluation device may be configured to determine the output signal on the basis of the pressure difference detected by the sensors (so-called differential pressure measurement for detecting the flow rate).

A bearing element which serves to guide the opening over the silage may comprise a runner or a rotatable wheel which is provided with a perforated lateral surface and which is able to be guided with a defined bearing force over the harvested crops. In the case of the runner, the opening may be integrated in the runner and in the case of the wheel the opening may be formed by the perforations.

Depending on the hole size of the perforations in the lateral surface of the wheel it may be expedient to detect the rotational position of the wheel about its axis and to take this into account in the evaluation. If the hole size of the perforations is relatively small compared to the size of the end region of the line adjacent to the silage and the entire lateral surface of the wheel is perforated, this rotational position has relatively little influence on the output signal of the sensor, since when rotating the wheel the influence of the respective rotational position of the wheel, and the position of the perforations dictated thereby, on the flow behavior of the pressurized medium does not have an effect on the output signal or to a negligible degree. However, this would be different if the hole size of the perforations in terms of order of magnitude were to be in the region of the diameter of the end region of the line adjacent to the silage. In this case, the rotational position of the wheel would significantly influence the output signal of the sensor since the material of the wheel located between the perforations covers more or less the end region of the line adjacent to the silage according to the rotational position. To solve this problem it is proposed to detect the rotational position of the wheel, to determine therefrom information regarding the covering of the end region of the line adjacent to the silage, for example, and to take this into account when generating the output signal of the sensor. In particular, the measurement may be carried out precisely when the perforation is aligned with the end region of the line adjacent to the silage. By detecting or taking into account the position of the perforations of the wheel, therefore, potential errors due to a throttle action of the perforations are avoided.

A compaction vehicle may also be provided with a disclosed sensor arrangement. The compaction vehicle may additionally be provided with a display device for the display of a density value dependent on the output signal of the sensor arrangement or an instruction to an operator derived using the output signal of the sensor arrangement or a control device for automatically influencing the compaction carried out by the compaction vehicle. To this end, reference is made to the disclosures of DE 10 2020 110 297 A1 and the references therein, which are all incorporated by reference herein. In addition, U.S. application Ser. No. 17/184,757 is hereby incorporated by reference herein.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
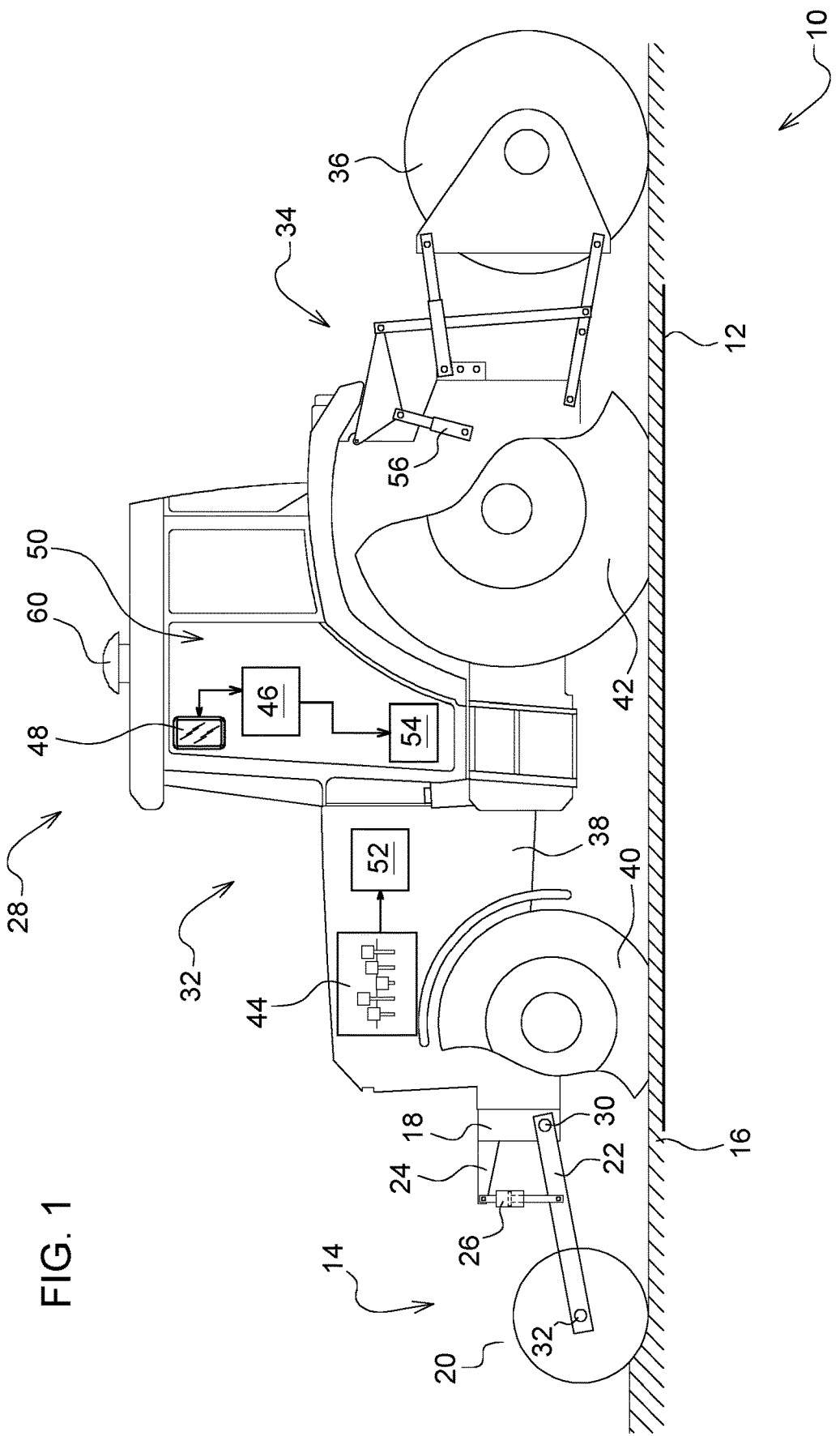
FIG. 1 shows a lateral schematic view of a silo with a compaction vehicle which is working therein and which is provided with a sensor arrangement for detecting the density of the harvested crops stored in the silo.

In FIG. 1 a silo 10 in the form of a so-called bunker silo is shown. The silo 10 comprises a floor 12 and side walls (not shown) which are generally all produced from concrete. The silo 10 is designed as a trench silo into which chopped foliage plants are introduced, distributed and compacted, as known in EP 3 403 487 A1 and EP 3 403 488 A1, the entire disclosures thereof being incorporated by reference herein. In addition, U.S. Pat. No. 10,617,054 is hereby incorporated by reference herein. The foliage plants may be harvested by a harvesting chain which consists of a harvesting vehicle in the form of a forage harvester and a towing vehicle with a trailer, or a loader wagon with a towing vehicle. The harvested crops are directly discharged from the trailer or loader wagon onto the silo 10 or initially deposited in a heap in the vicinity thereof and distributed on the silo 10 by a suitable vehicle or other means. The harvested crops are then compacted by a compaction vehicle 28 which is moved along travel paths over the silo 10. In the embodiment in FIG. 1, the compaction vehicle 28 is connected to a relatively wide compaction device 36. If a separate compaction device 36 is not used, the compaction may be carried out simply by the wheels 40, 42 of the compaction vehicle 28 alone.

The chopped foliage plants, denoted hereinafter as silage 16, may be supplied with an ensilage agent during harvesting or during or after storage in order to improve the fermentation. Additionally, after the compaction the silage 16 is covered at the top and toward the open sides of the silo 10 with a film in order to shield the silage from the oxygen of the ambient air.

The compaction vehicle 28 is composed of a tractor 32 and the compaction device 36 in the form of a roller attached to the three-point hitch 34 thereof. The compaction device 36 could also be dispensed with or replaced by a ballast weight. The compaction is carried out in this case by the wheels 40, 42 of the compaction vehicle 28. Instead of a tractor 32, a vibrating roller (single drum roller) or any other vehicle, for example, a snow groomer, could also be used as a compaction vehicle 28.

The tractor 32 comprises a load-bearing chassis 38 which is supported on steerable front wheels 40 and drivable rear wheels 42, which are drive-connected to the crankshaft of an internal combustion engine 44 in a torque-proof manner. An electronic control device 46 (the computing power thereof also being able to be outsourced, whether to a computer which is remote, stationary or designed as a mobile device, for example, of the operator or the Cloud) is connected to an operator interface 48 which is assigned to the workstation of an operator in a cab 50. The control device 46 is also connected in a signal-transmitting manner to an automatic steering and speed control device 52, a tire pressure regulator 54, a position determining device 60 and an actuator 56 (power lifter) for adjusting the position of the lower link arm of the three-point hitch 34, and is configured to control this automatically. By the actuator 56, the contact force of the compaction device 36 may be varied and the compaction device lifted away.

When storing the silage 16 for the purpose of compaction, the compaction vehicle 28 is automatically moved by the control device 46 or steered by the driver along travel paths, i.e., generally driven to and fro parallel to the side walls of the silo 10 until a desired degree of compaction is achieved. Subsequently a layer of new silage 16 is applied and compacted again until the silo 10 is filled. In a further method, however, it might also be possible to fill the silo 10 gradually in the horizontal direction and then compact the silo when it is filled. A combination of the two methods is also conceivable. A possible automation of the compaction is disclosed in DE 10 2020 110 297 A1. (U.S. application Ser. No. 17/184,757 is incorporated by reference herein.)

For measuring the density of the silage 16, the compaction vehicle 28 is provided with a sensor arrangement 14. The sensor arrangement 14 comprises a wheel 20 which is freely rotatably mounted on a hub 32. The hub is mounted on a rocker arm 22 which is articulated at a pivot point 30 on a bracket 18 which in turn is fastened to the front side of the compaction vehicle 28, for example, to a front weight or to a front three-point hitch, or is formed thereby. A pretensioning element 26, the one end being articulated on the rocker arm 22 and the other end on a rigid fastening 24, serves to pretension the rocker arm 22 and thus the wheel 20 during the compaction process with a predetermined force against the silage 16 and to lift away the rocker arm 22 and thus the wheel 20 upwardly into an inactive position when not in use. The rotational axes of the pivot point 30, of the hub 32 (and thus of the wheel 20) and the axes of articulation of the pretensioning element 26 are oriented horizontally and transversely to the forward direction of the compaction vehicle 28 which runs to the left in FIG. 1. In contrast to FIG. 1, rocker arms 22 could be arranged on both sides of the wheel 20, i.e., the rocker arms 22 could be designed as a fork. The pretensioning element 26 is thus articulated on one or both rocker arms 22. The pretensioning element 26 may be designed as a hydraulic or pneumatic cylinder and acted upon by the on-board hydraulic system or pneumatic system of the compaction vehicle 28.

Figure 4:
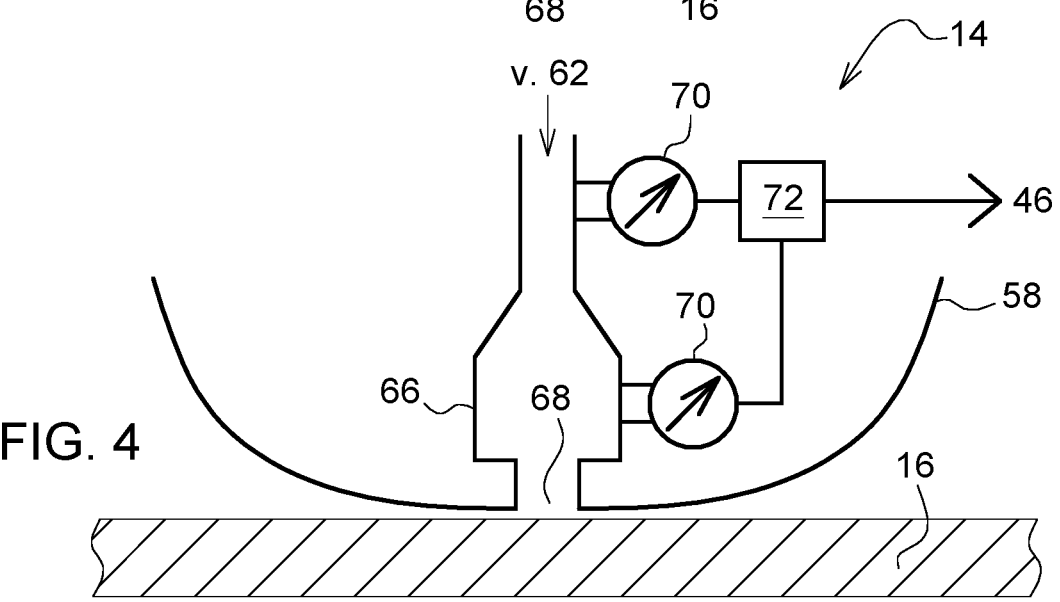
FIG. 4 shows an enlarged view of a third embodiment of a sensor arrangement.

For all embodiments of the sensor arrangement 14 a runner 58 could be used instead of the wheel 20, as shown in FIG. 4. In embodiments in which a compaction device 36 is dispensed with or when sufficient space is still present in spite of the attachment of a compaction device 36 to the rear side of the compaction vehicle 28, the sensor arrangement 14 could also be fastened thereto, for example, to the rear three-point hitch 34.

Figure 2:
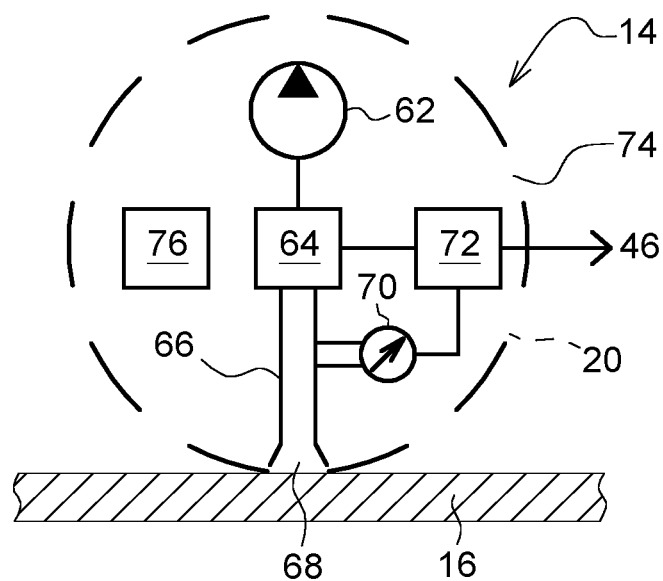
FIG. 2 shows an enlarged view of a first embodiment of a sensor arrangement.

FIG. 2 shows an enlarged schematic view of a first possible embodiment of a sensor arrangement 14. The sensor arrangement 14 comprises a source 62 of a gaseous medium which is at an overpressure, i.e., a pressure which is greater than that of the ambient air. The medium is, in particular, compressed air which may be provided, for example, by the on-board pneumatic system of the compaction vehicle 28 (i.e., the pneumatic braking system thereof) or it is taken from a compressed gas bottle. The source 62 is connected to a valve 64, the free diameter thereof being adjustable by an electromagnetic actuator, and the valve is electrically connected to an evaluation device 72. The valve 64 on the outlet side is connected to a line 66 which at its lower end transitions into an opening 68 which faces the lower face of the wheel 20 and is adjacent thereto. A sensor 70 detects the volumetric flow rate in the line 66 and supplies the evaluation device 72 with a corresponding electrical signal which contains information regarding the volumetric flow rate in the line 66 and thus through the opening 66. The line 66, the sensor 70 and the opening 68 do not rotate with the wheel 20 when the wheel is moved over the silage 16, but are rigidly coupled to the rocker arm 22, so that during compaction mode the opening 68 is continuously aligned downwardly. As already mentioned above, the source 62 may be arranged on-board the compaction vehicle 28 which similarly applies to the valve 64 and the evaluation device 72 or as shown in FIG. 2 they are integrated spatially in the wheel 20 of the sensor arrangement 14.

The wheel 20 comprises a perforated lateral surface forming its periphery so that the gas from the end region of the line 66 adjacent to the silage 16 may flow through the lateral surface of the wheel 20 (forming the opening 68) into the silage 16. To the side, the wheel 20 may be connected by spokes (or closed walls) to the hub 32. The hole size of the perforations 74 corresponds in FIGS. 2 and 3 approximately to the diameter of the end region of the line 66 adjacent to the silage 16. The end region of the line 66 adjacent to the silage 16 may have a cross section of any shape, i.e., for example, rectangular, circular or oval. The cross section of the perforations 74 can be analogous in any way, for example, rectangular, circular or oval. In particular, the cross sections of the perforations 74 and of the end region of the line 66 adjacent to the silage 16 at least approximately coincide in terms of shape and dimensions, or the perforations 74 are dimensioned to be larger than the end region of the line 66 adjacent to the silage 16. By the relatively large dimension of the hole size of the perforations 74 it is achieved that as few particles as possible of the silage 16 collect in the perforations 74. However, it might also be conceivable to select the hole size of the perforations 74 to be smaller than the size of the end region of the line 66 adjacent to the silage 16, in order to permit a continuous measuring mode in which the outflow of the gaseous medium from the line 66 is not regularly interrupted by the material of the wheel 20 which remains between the perforations 74 or the throttle action, which changes with the rotation of the wheel 20 and is dictated by the material of the lateral surface of the wheel 20 between the perforations 74, is at least approximately averaged out over time.

Figure 3:
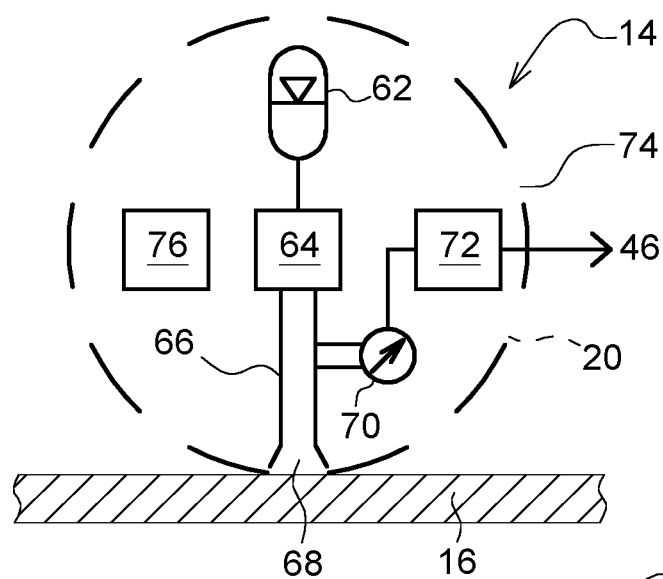
FIG. 3 shows an enlarged view of a second embodiment of a sensor arrangement.

In the embodiment shown in FIGS. 2 and 3 in which the hole size of the perforations 74 corresponds approximately to the dimension of the end region of the line 66 adjacent to the silage 16, the line 66 is regularly covered by the material of the wheel 20 which is located between the perforations 74. In order to avoid this falsifying effect on the output signal of the evaluation device 72, the rotational position of the wheel 20 may be detected by a rotary angle sensor 76 (also in the embodiment according to FIG. 3). Using a known correlation stored in the evaluation device 72 between the rotational position of the wheel 20 and the position of the perforations 74, the evaluation device 72 connected to the rotary angle sensor 76 may be configured to take into account the influence of the rotational position of the wheel 20 on the output signal, in particular since a measurement is carried out when a perforation 74 is precisely aligned with the lower end region of the line 66.

The mode of operation of the first embodiment shown in FIG. 2 is based on the density of the silage 16 influencing the flow behavior of the gaseous medium flowing downwardly out of the opening 68. If the silage 16 is well compacted, it provides a significant flow resistance against the gaseous medium, but this flow resistance would be lower if the silage 16 were to be less well compacted. In order to be able to detect a representative variable for the aforementioned flow resistance, it is provided that during operation the evaluation device 72 adjusts the valve 64 such that (by electrically adjusting the actuator assigned to the valve 64) the sensor 70 of the evaluation device 72 displays a predetermined value for the volumetric flow rate in the line 66. If, therefore, the predetermined value of the volumetric flow rate is reached with a valve 64 opened to a relatively small extent, the silage 16 is compacted to a greater degree than if the valve 64 has to be opened further for producing the same volumetric flow rate. The actuating signal to the valve 64 or a pressure measured upstream or downstream of the valve 64 by a further sensor (not shown) is thus a measurement of the density of the silage 16. The evaluation device 72 forwards the actuating signal or one of the pressure values (or a value dependent thereon, in particular calibrated to the density of the silage, for example, measured in $kg/m^3$ or a proportion of the harvested crops in the silage volume measured in %) to the control device 46. The control device may display the determined value of the density on the operator interface 48 or instructions derived therefrom to the operator, from which it is possible to identify whether and where the silage has to be still recompacted, or may use this value for automatically activating the compaction vehicle 32, as is disclosed in DE 10 2020 110 297 A1, the disclosure being incorporated by reference herein. (U.S. application Ser. No. 17/184,757 is incorporated by reference herein.) The sensor arrangement 14 may operate continuously or may be activated intermittently, for example, after covering defined distances, for example, every 0.5 m or carry out a measurement and provide an output signal precisely when the lower end region of the line 66 is aligned with a perforation 74, which may be detected as described above using the rotary angle sensor 76.

In the second embodiment shown in FIG. 3 of the sensor arrangement 14, elements which coincide or which are equivalent to the first embodiment are identified by the same reference numerals. The source 62 is illustrated here as a pressure accumulator but may be replaced by a source mentioned in connection with FIG. 2. In the second embodiment, the valve 64 is a pressure relief valve and accordingly provides the medium at a predetermined pressure at its outlet. The medium flows from the valve 64 through the line 66 and through the opening 68 and finally into the silage 16. The sensor 70 detects, as in the first embodiment, the volumetric flow rate of the medium through the line 66. The evaluation device 72 is electrically connected to the sensor 70 and also to the control device 46.

The mode of operation of the second embodiment is similar to that of the first embodiment but does not operate at a constant flow of the medium as in the first embodiment but at a constant pressure and the volumetric flow rate, which is dependent on the flow resistance to which the gaseous medium is subjected in the silage 16, is detected. The evaluation device 72 forwards the signal of the sensor 70 (or a value dependent thereon, in particular calibrated to the density of the silage) to the control device 46 which uses the value in the manner described relative to the first embodiment.

In the third embodiment shown in FIG. 4 of the sensor arrangement 14, elements which coincide or which are equivalent to the first or second embodiment are also identified by the same reference numerals. In the sensor arrangement according to FIG. 4, the wheel 20 has been replaced by a skid 58 which is guided over the silage 16 by the rocker arm 22 of FIG. 1 at a pressure defined by the pretensioning element 26.

The line 66 widens downstream of the source 62 in a continuous or stepwise manner and one respective sensor 70, which is, however, designed as a pressure sensor, is assigned to a portion of the line 66 which has a different diameter from the portion of the line 66 assigned to the other sensor 70. The line 66 tapers again at the lower end directly upstream and above the opening 68, which however is optional.

The mode of operation of the third embodiment is based on a measurement of the flow rate of the medium through the silage 16—dependent on the density of the silage 16—and thus through the line 66. In the case of dense silage 16, the flow rate through the line—at a constant pressure of the source 62—is less than in the case of less dense silage since in the second case more medium will flow out through the opening 68. The flow rate could be detected directly by a single sensor 70 designed as a speed sensor, which could also be used, for example, instead of the sensor 70 of the embodiment of FIG. 2 or 3 detecting the volumetric flow rate, but in the embodiment of FIG. 4 the flow rate is determined using a differential pressure measurement. To this end, both sensors 70 are designed as pressure sensors, as already mentioned above, and assigned to sections of the line 66 having different diameters and thus different flow rates and pressures. In FIG. 4, therefore, a so-called differential pressure sensor is used for determining the flow rate. The evaluation device 72 connected to both sensors 70 accordingly determines the flow rate using the signals of both sensors 70 and the known diameters of the line 66 (for example, by using Bernoulli's principle) and on the basis thereof in turn determines a value dependent on the density of the silage 16 and forwards it to the control device 46 which uses the value in the manner described relative to the first embodiment.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A sensor arrangement for detecting a density of harvested crops deposited as silage in a silo, comprising:
    a source of a pressurized gaseous medium;
    an opening connected by a line to the source and which is movable along a surface of the silage, the gaseous medium being guided out of the opening from the source into the silage;
    a sensor for detecting a property of the medium flowing through the line; and
    an evaluation device connected to the sensor and configured to provide an output signal including information based on the signal of the sensor regarding the density of the silage.

2. The sensor arrangement as claimed in claim 1, wherein the sensor detects a variable influenced by a flow resistance applied by the silage against the medium flowing out through the opening.

3. The sensor arrangement as claimed in claim 2, wherein the sensor derives the output signal from the variable.

4. The sensor arrangement as claimed in claim 2, wherein the sensor detects the volumetric flow of the medium through the line.

5. The sensor arrangement as claimed in claim 4, wherein the evaluation device is connected to an adjustable valve arranged between the source and the opening.

6. The sensor arrangement as claimed in claim 5, wherein the valve is positioned to influence the pressure of the medium at the opening.

7. The sensor arrangement as claimed in claim 5, wherein the evaluation device activates the valve to control the pressure of the medium such that the volumetric flow rate detected by the sensor corresponds to a target value.

8. The sensor arrangement as claimed in claim 7, wherein the evaluation device determines the output signal based on the pressure measured upstream or downstream of the valve.

9. The sensor arrangement as claimed in claim 2, wherein:
    the pressure of the medium at the opening is adjustable to a predetermined pressure by a valve arranged between the source and the opening; and
    the evaluation device determines the output signal on the basis of the volumetric flow rate detected by the sensor.

10. The sensor arrangement as claimed in claim 2, wherein the sensor detects the flow rate of the medium through the opening.

11. The sensor arrangement as claimed in claim 10, wherein the sensor comprises two pressure sensors arranged at different locations along the line between the source and the opening, the evaluation device determining the output signal on the basis of the pressure difference detected by the two pressure sensors.

12. The sensor arrangement as claimed in claim 1, further comprising a bearing element for guiding the opening on the silage in the form of a runner or a rotatable wheel provided with a perforated lateral surface and which is guided with a defined bearing force over the silage.

13. The sensor arrangement as claimed in claim 12, wherein the dimensions of the open end of the line adjacent to the silage approximately corresponds to the dimensions of the perforated lateral surface of the wheel.

14. The sensor arrangement as claimed in claim 13, wherein the evaluation device is connected to a rotary angle sensor for detecting the rotary angle of the wheel, the evaluation device outputting an output signal when, based on the signal from the rotary angle sensor, that the perforation is aligned with the open end of the line.

15. A compaction vehicle, comprising:
    an operator interface; and
    a sensor arrangement for detecting a density of harvested crops deposited as silage in a silo, the sensor arrangement including a source of a pressurized gaseous medium, an opening connected by a line to the source and which is movable along a surface of the silage such that the gaseous medium is guided out of the opening from the source into the silage, a sensor for detecting a property of the medium flowing through the line, and an evaluation device connected to the sensor and outputting an output signal including information based on the signal of the sensor regarding the density of the silage;
    wherein, the operator interface displays a density value dependent on the output signal of the sensor arrangement or an instruction derived on the basis of the output signal of the sensor arrangement to an operator.

16. The compaction vehicle as claimed in claim 15, further comprising a control device for automatically influencing a compaction carried out by the compaction vehicle.

17. The compaction vehicle as claimed in claim 15, wherein the sensor detects a variable influenced by a flow resistance applied by the silage against the medium flowing out through the opening, the sensor deriving the output signal from the variable.

18. The compaction vehicle as claimed in claim 15, wherein the evaluation device is connected to an adjustable valve arranged between the source and the opening, the valve being positioned to influence the pressure of the medium at the opening.

19. The compaction vehicle as claimed in claim 18, wherein the evaluation device activates the valve to control the pressure of the medium such that the volumetric flow rate detected by the sensor corresponds to a target value.

20. A sensor arrangement for detecting a density of harvested crops deposited as silage in a silo, comprising:
   a source of a pressurized gaseous medium,
   an opening connected by a line to the source and which is movable along a surface of the silage, the gaseous medium being guided out of the opening from the source into the silage,
   a sensor for detecting a property of the medium flowing through the line,
   an evaluation device connected to the sensor and configured to provide an output signal including information based on the signal of the sensor regarding the density of the silage, and
   a valve positioned between the source and the opening, the pressure of the medium at the opening being adjustably controlled to a predetermined pressure by the valve,
   wherein, the evaluation device determines the output signal on the basis of a volumetric flow rate detected by the sensor.

* * * * *